Figure 1:
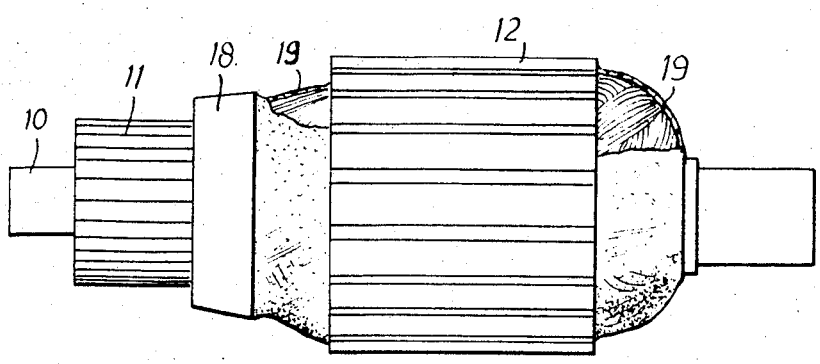

United States Patent

Roue

[15] 3,697,792
[45] Oct. 10, 1972

[54] ELECTRIC MOTOR ARMATURE WITH STRESS RELIEVED, RESILIENT COMMUTATOR LEAD CONNECTIONS

[72] Inventor: Albert Norman Roue, Bedford, England

[73] Assignee: Kango Electric Hammers Limited, London, England

[22] Filed: Jan. 25, 1971

[21] Appl. No.: 109,504

[30] Foreign Application Priority Data

Feb. 2, 1970    Great Britain............4,956/70

[52] U.S. Cl. ..................310/234, 310/235, 310/236
[51] Int. Cl. ............................................H02k 13/04
[58] Field of Search.....................310/233–236, 237

[56] References Cited

UNITED STATES PATENTS

| | | | |
|---|---|---|---|
| 3,213,307 | 9/1965 | Summerfield | 310/234 |
| 3,471,731 | 9/1969 | Pratt et al. | 310/234 |
| 3,209,186 | 9/1965 | Bolzan, Jr. | 310/234 |
| 3,129,349 | 4/1964 | Ervin | 310/234 |
| 447,384 | 3/1891 | Thompson | 310/233 |
| 732,235 | 6/1903 | Swan | 310/233 X |
| 2,188,170 | 1/1940 | Zschau | 310/233 |
| 2,696,570 | 12/1954 | Pandapas | 310/235 X |

Primary Examiner—J. D. Miller
Assistant Examiner—Mark O. Budd
Attorney—Wenderoth, Lind & Ponack

[57] ABSTRACT

An armature for an electric motor has commutator segments, an armature coil structure consisting of coils having end portion which lead to the commutator segments and each of which has a looped part adjacent the associated commutator segment, and sleeves of yieldable resilient material snugly surrounding the looped parts. A moulded rigid mass of resinous material extends locally only in the region of the commutator and encapsulates the sleeves parts of the coil end portions and the connections of the end portions to the commutator segments. The yieldable nature of the sleeves permits a degree of relative movement of the looped parts within the moulded mass. A thin layer trickle coating of an electrically insulating material encases the parts of the coil structure not encapsulated in said mass.

4 Claims, 2 Drawing Figures

ELECTRIC MOTOR ARMATURE WITH STRESS RELIEVED, RESILIENT COMMUTATOR LEAD CONNECTIONS

This invention relates to armatures for electric motors.

According to this invention there is provided an armature for an electric motor having commutator segments, an armature coil structure consisting of coils having end portions which lead to the commutator segments and each of which has a looped part adjacent the associated commutator segment, and sleeves of yieldable resilient material snugly surrounding the looped parts, a moulded rigid mass of resinous material extending locally only in the region of the commutator and encapsulating the sleeved parts of the coil end portions and the connections of the end portions to the commutator segments, the yieldable nature of the sleeves permitting a degree of relative movement of the looped parts within the moulded mass, and a thin layer trickle coating of an electrically insulating material encasing the parts of the coil structure not encapsulated in said mass.

According to a preferred feature of the invention, said mass of resinous material is externally of frusto-conical shape.

According to another preferred feature of the invention, the ends of the sleeves are in axial abutment with the commutator segments.

The sleeves are preferably made from silicone rubber.

The invention also provides an electric motor having an armature as set forth in the second paragraph of this statement.

Figure 2:
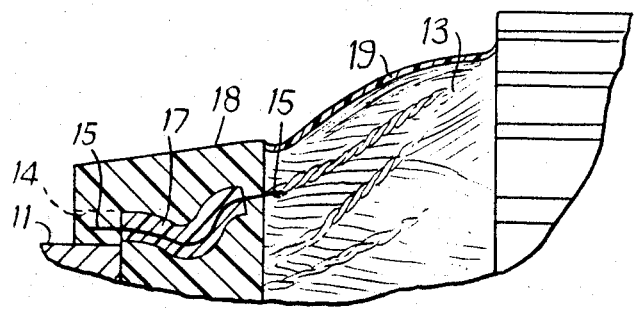

One embodiment of the invention will now be described in more detail with reference to the accompanying diagrammatic drawings in which:

FIG. 1 is a fragmentary view of an electric motor armature according to the invention, and FIG. 2 is a fragmentary axial section through the encapsulating body and one of the riser slots of the armature shown in FIG. 1.

Referring to the drawings, the armature includes a shaft 10 on which are secured a commutator 11 and a laminated core 12 having slots in which armature coils 13 are wound. Each segment of the commutator has an integral riser 14 at its end adjacent the core and an axial slot cut in each riser. The ends of the armature coils are paired and secured, as by soldering, welding or hot-staking, in the respective riser slots. These end portions 15 of the coils are of excess length, that is to say they are longer than is necessary for them to extend in a straight line between the ends of coils and the riser slot, and in the illustrated arrangement the end portions 15 extend in a loop or bight. The looped part of the portions 15 are enclosed in a sleeve 17 which is made from resilient insulating material such as silicone rubber and which extends up to the riser slot.

The commutator risers and the looped sleeve portions 15 are subsequently embedded in a body 18 of epoxy or epoxide resin which is moulded about them, so that they are incorporated in a monolithic type of structure extending strictly locally in the region of the risers so that interference with the dissipation of heat generated in the coils is kept to a minimum. The body 18 may, as shown, conveniently be externally frusto-conical for ease of removal from the mould. It will be understood that the appropriate part of the armature can readily be moved axially into a mould of the cup type for this purpose and can equally readily be lifted from the mould after the body 18 has been moulded, since the mould will be axially short and need not be a split mould. It will also be clear that this arrangement lends itself to the adoption of a mould having a plurality of mould cavities each shaped to receive the appropriate parts of an armature, all the cavities being supplied with moulding material through respective branches of a common supply passage.

The material of the sleeves is impervious to the material of the body 18 so that the sleeves do not soak up the epoxy or epoxide resin during the moulding of the body 18 and retain their resilience.

After the body 18 has been moulded, the armature coils are trickle impregnated with a thin layer of an epoxy or epoxide resin, the surface portion of which is shown at 19, so that the coils become bonded together. The thickness of layer 19 is greatly exaggerated for illustrative purposes in the drawing. The thin layer of trickle impregnation ensures that the dissipation of heat generated in the coils is not unduly impeded as occurs unavoidably in the body 18.

The body 18 of plastics material holds the wires rigidly against centrifugal and shock forces, but at the same time any relative movement of the commutator and the coils, for example owing to differential thermal expansion or contraction, is compensated by a reduction or increase in the curvature of the loop, which is accommodated by a corresponding deformation of the surrounding sleeve.

The thickness of the sleeve and its capacity for yielding or compressibility are selected according to the likely deformation of the wires, and the internal diameter of the sleeves is selected to fit snugly over the wires to prevent the ingress of resin during the moulding of the body 18, since such resin might restrict the desired freedom of the wires. It is preferred to keep the axial length of the looped part as nearly as reasonably practicable (due regard being paid to the safety factor) to the minimum necessary to permit, without failure of the coil end portions or their connections to the commutator, the relative axial movement of the commutator and coils which occurs under the appropriate test conditions due to thermal differential expansion and contraction. The wires may if necessary, however, extend in other looped configurations to accommodate relative movement of the commutator and coils and/or to withstand physical shocks.

If desired, the paired ends of the coils may be connected to a single wire which is made from a fatigue-resistant material such as phosphor-bronze and which is secured in the riser slot, this wire being encased in the sleeve and enclosed in the encapsulating body.

The armatures particularly described above have an important but not exclusive application in motors for use under conditions where robustness is essential, as for example in electric hammers.

I claim:

1. An armature for an electric motor having commutator segments, an armature coil structure comprising coils having end portions which lead to the commutator segments and each of which has a looped part adjacent the associated commutator segment, and sleeves of yieldable resilient material snugly surrounding the looped parts, a moulded rigid mass of resinous material extending locally only in the region of the commutator and encapsulating the sleeved parts of the coil end portions and part of the axial length of the commutator segments including the connections thereto of the ends of the coils, the yieldable nature of the sleeves permitting a degree of relative movement of the looped parts within the moulded mass, and a thin layer trickle coating of a setting electrically insulating material encasing the parts of the coil structure not encapsulated in said mass.

2. An armature as claimed in claim 1, wherein said mass of resinous material is externally of frusto-conical shape.

3. An armature as claimed in claim 1, wherein the ends of the sleeves are in axial abutment with the commutator segments.

4. An armature as claimed in claim 1, wherein the sleeves are made from silicone rubber.

* * * * *